United States Patent
Perry et al.

(10) Patent No.: US 8,037,039 B2
(45) Date of Patent: Oct. 11, 2011

(54) RUNTIME CLASS DATABASE OPERATION

(75) Inventors: Carl Yates Perry, Woodinville, WA (US); Jeffrey Michael Derstadt, Seattle, WA (US); Andrew J. Conrad, Sammamish, WA (US); Jeffrey E. Reed, Lake Stevens, WA (US); Shyamalan Pather, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/838,705

(22) Filed: Aug. 14, 2007

(65) Prior Publication Data

US 2008/0263078 A1 Oct. 23, 2008

Related U.S. Application Data

(60) Provisional application No. 60/913,180, filed on Apr. 20, 2007, provisional application No. 60/913,183, filed on Apr. 20, 2007, provisional application No. 60/913,186, filed on Apr. 20, 2007.

(51) Int. Cl.
*G06F 17/00* (2006.01)
*G06F 17/30* (2006.01)

(52) U.S. Cl. ......... 707/702; 707/706; 707/781; 707/796

(58) Field of Classification Search ................ 707/694, 707/735, 756, 778, 781, 791, 795, 802, 803, 707/805, 829
See application file for complete search history.

(56) References Cited

U.S. PATENT DOCUMENTS

| | | | |
|---|---|---|---|
| 5,295,256 A * | 3/1994 | Bapat | 717/137 |
| 5,315,709 A | 5/1994 | Alston, Jr. et al. | |
| 5,475,843 A * | 12/1995 | Halviatti et al. | 717/124 |
| 5,721,917 A * | 2/1998 | Elliott et al. | 718/101 |
| 5,900,870 A * | 5/1999 | Malone et al. | 715/866 |
| 5,940,075 A | 8/1999 | Mutschler, III et al. | |
| 5,999,732 A * | 12/1999 | Bak et al. | 717/148 |
| 6,002,401 A * | 12/1999 | Baker | 715/839 |
| 6,006,242 A | 12/1999 | Poole et al. | |
| 6,065,012 A | 5/2000 | Balsara et al. | |
| 6,496,835 B2 | 12/2002 | Liu et al. | |
| 6,792,607 B1 | 9/2004 | Burd et al. | |
| 6,961,750 B1 | 11/2005 | Burd et al. | |
| 7,127,474 B2 | 10/2006 | Williamson et al. | |
| 7,171,646 B2 * | 1/2007 | Charisius et al. | 717/100 |
| 7,468,731 B2 * | 12/2008 | Eldridge et al. | 345/581 |
| 7,720,879 B2 * | 5/2010 | Tsyganskiy et al. | 707/803 |
| 2004/0015829 A1 * | 1/2004 | Mullins et al. | 717/104 |
| 2004/0107183 A1 | 6/2004 | Mangan | |
| 2004/0210445 A1 * | 10/2004 | Veronese et al. | 705/1 |

(Continued)

OTHER PUBLICATIONS

Visser Elco, "Scoped Dynamic Rewrite Rules", http://66.102.1.104/scholar?hl=en&lr=&q=cache:OyWO1wZsWIAJ: www.library.uu.nl/digiarchief/dip/dispute/2002-0308-092421/2001-29.pdf, Institute of Information and Computing Sciences, Universiteit Utrecht, P.O. Box 80089, 3508 TB Utrecht, The Netherlands, 29 pages.

(Continued)

*Primary Examiner* — Srirama Channavajjala
*Assistant Examiner* — Reza Hosseini

(57) ABSTRACT

Programmers typically like operating with databases through use of classes. Classes allow a user to function with a database through use of a non-database programming language. To ease use of the classes, a class context is generated at runtime that does not force a programmer to handle various source files that are a product of class generation. Therefore, the user can have the ease of using classes without having to perform extra actions.

17 Claims, 12 Drawing Sheets

U.S. PATENT DOCUMENTS

| | | | |
|---|---|---|---|
| 2004/0267760 | A1 | 12/2004 | Brundage et al. |
| 2005/0102649 | A1 | 5/2005 | Hogg et al. |
| 2005/0172264 | A1 | 8/2005 | Yuknewicz et al. |
| 2005/0289457 | A1 | 12/2005 | Obasanjo et al. |
| 2006/0015485 | A1 | 1/2006 | Hofmann |
| 2006/0059107 | A1* | 3/2006 | Elmore et al. ............ 705/64 |
| 2006/0074873 | A1 | 4/2006 | Dettinger et al. |
| 2006/0074981 | A1 | 4/2006 | Mauceri, Jr. et al. |
| 2006/0074994 | A1 | 4/2006 | Smits |
| 2006/0085342 | A1 | 4/2006 | Chen et al. |
| 2006/0150172 | A1 | 7/2006 | Heath et al. |
| 2006/0167880 | A1 | 7/2006 | Meijer et al. |
| 2006/0173863 | A1 | 8/2006 | Paulus et al. |
| 2006/0195425 | A1 | 8/2006 | Deem et al. |
| 2007/0038666 | A1 | 2/2007 | Meijer et al. |
| 2007/0050380 | A1 | 3/2007 | Meijer et al. |
| 2007/0074185 | A1 | 3/2007 | Meijer et al. |

OTHER PUBLICATIONS

Attali Isabelle, et al., "A Natural Semantics for Eiffel Dynamic Binding", http://delivery.acm.org/10.1145/240000/236118/p711-attali.pdf?key1=236118&key2=8801100811&coll=GUIDE&dl=GUIDE&CFID=23471572&CFTOKEN=40029597, ACM Transactions on Programming Languages and Systems, vol. 18, No. 6, Nov. 1996, pp. 711729.

Grundy John C., et al., "Providing Integrated Support for Multiple Development Notations", http://www.cs.auckland.ac.nz/~john-g/papersicaise95.pdf, Department of Computer Science, University of Waikato Private Bag 3105, Hamilton, New Zealand, 14 pages.

Strahl, "Simplify Data Binding in ASP.NET 2.0 With Our Custom Control", http://msdn.microsoft.com/msdnmag/issues/06/12/ExtendASPNET/default.aspx, MSDN Magazine, 11 pages.

"Data Binding Overview", http://msdn2.microsoft.com/en-us/library/ms752347.aspx, MSDA, © 2007 Microsoft Corporation, 12 pages.

Ogbuji, "Introducing Anobind", http://www.xml.com/pub/a/2003/08/13/py-xml.html, last accessed on Aug. 16, 2007, 7 pages, Aug. 13, 2003.

"Smart Software", http://wesnerm.blogs.com/net_undocumented/2005/09/index.html, Sep. 24, 2005, 13 pages.

"DevHawk—Development", http://devhawk.net/SyndicationService.asmx/GetRssCategory?categoryName=Development, last accessed Aug. 17, 2007, Tuesday, Mar. 14, 2006, 7 pages.

Meijer, Eric, "Functional Programming Has Reached the Masses; It's Called Visual Basic", http://lambda-the-ultimate.org/node/1406, last acessed on Aug. 16, 2007, Apr. 9, 2006, 7 pages.

Blakeley, et al., "The ADO.NET Entity Framework: Making the Conceptual Level Real", http://delivery.acm.org/10.1145/1230000/1228275/p32-blakeley.pdf key1=1228275&key2=9264899711&coll=GUIDE&dl=GUIDE&CFID=19482078&CFTOKEN=71907954, Microsoft Corporation, One Microsoft Way, Redmond, WA 98052-6399, USA, SIGMOD Record, vol. 35, No. 4, Dec. 2006, 8 Pages.

"OakLeaf Systems", http://www.blogger.com/feeds/11646261/posts/default, Last accessed on Aug. 17, 2007, Friday, May 4, 2007, 11 pages.

* cited by examiner

RUNTIME CLASS DATABASE OPERATION

CROSS-REFERENCE

This application claims priority to U.S. Provisional Application Ser. No. 60/913,180 entitled "GENERATION OF RUNTIME TYPES AND EXTENSIBILITY OF NAME GENERATION" filed on Apr. 20, 2007. The entirety of which is incorporated by reference herein.

This application also claims priority to U.S. Provisional Application Ser. No. 60/913,183 entitled "AUTOMATIC DATABINDING BINDING OF DYNAMICALLY/RUNTIME GENERATED TYPES TO FORMS" filed on Apr. 20, 2007. The entirety of which is incorporated by reference herein.

This application additionally claims priority to U.S. Provisional Application Ser. No. 60/913,186 entitled "TRANSLATING LATE BOUND LINQ EXPRESSIONS INTO DATABASE QUERIES" filed on Apr. 20, 2007. The entirety of which is incorporated by reference herein.

TECHNICAL FIELD

The subject specification relates generally to databases and in particular to generation of classes at runtime.

BACKGROUND

Databases have become a popular resource for storing relatively large amounts of information. Various electronic devices (e.g., personal computers, cellular telephones, personal digital assistants, etc.) can access databases to write new information and/or read stored data. When a write request takes place, the database can store information in an organized manner so it can be easily accessed at a later time. A device authorized to read information from the database can sent a query requesting specific information. The query is processed and a result is returned to a requester.

A common organizational structure used by a database is a relational model. In a relational model, information is commonly stored in a variety of tables. Thus, individual entries of information are associated with a row and a column. According to one configuration, a table first row discloses attributes while subsequent rows disclose attribute values. Models other then relational can be applied to a database, such as a hierarchical model, network model, object model, etc.

Due to the importance of databases, different database features allow for efficient utilization of saved information. Since a large amount of information can reside in a database, pure reading of database information can produce relatively slow results. Indexing can be employed to navigate different tables to find information without performing a full read on stored information. Furthermore, information stored on a master database can replicate onto different slave databases. One main benefit of using a master/slave configuration allows for multiple copies of information in case an error occurs. In addition, there is minimal confusion between databases since a master controls slave databases.

SUMMARY

The following presents a simplified summary of the specification in order to provide a basic understanding of some aspects of the specification. This summary is not an extensive overview of the specification. It is intended to neither identify key or critical elements of the specification nor delineate the scope of the subject specification. Its sole purpose is to present some concepts of the specification in a simplified form as a prelude to the more detailed description that is presented later.

Commonly, developers write programs that access resources in a database. However, developers operate in a native language (e.g., C#) while the database functions in a language different then the native language (e.g., Structured Query Language.) Several arrangements are available that allows a user to access the information. In one configuration, a programmer can write individuals queries to the database, where the database returns rows of information. This solution can become tedious to a programmer since obtaining necessary database information can require a relatively large amount of queries. One solution is that code is written in class abstractions that allow a user to write database queries in the native language. A flaw with the solution is that it generates source files filled with metadata that is managed by a programmer.

The subject specification discloses class generation at runtime, which allows a user to write in classes without having to manage source files. Various classes are generated and then one context class is produced that has properties requested by a user. Since this is performed at runtime, the source files are automatically processed and are not manifested directly to a programmer. This allows a programmer to operate with classes that are likely more natural to the programmer with relative ease.

Different embodiments allow a programmer to perform different operations in relation to a database. The subject specification allows for a relatively large amount of customization that enables a programmer to obtain desired results. For instance, a user can provide a map file that is to be used in construction of at least one class. A standard map file is replaced with a user provided map file and classes are generated in accordance with a user's request. Moreover, a user can provide logic that is used in class generation as well as rule formats that are to be followed when constructing a class. A property name can be limited to a certain size and/or certain rules are given priority when for building at least one class.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
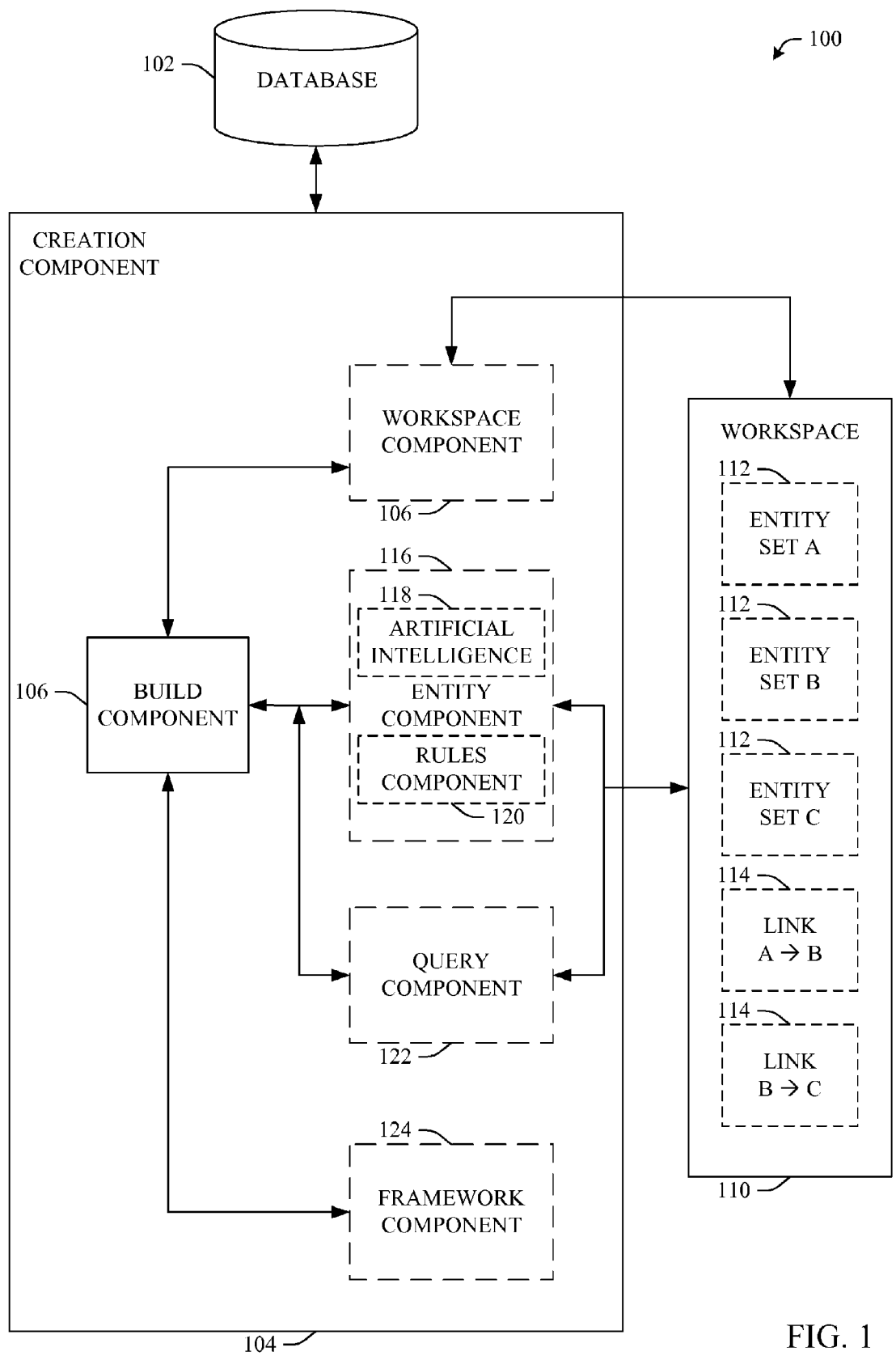
FIG. 1 illustrates a representative context class construction system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 for construction of various structures that relate to a context class. A database 102 can hold information that is accessible by a number of different units on a network. A common configuration allows the database to integrate with a database management system that manages various aspects of the database. Ultimately, the system 100 builds a class layer over the database 102 that allows a user to operate upon the database in a native programming language.

A creation component 104 generates various modules that can facilitate construction of a context class for a database 102. At runtime, different units function in order to create a context class usable by a programmer. Conventionally, programmers desire to program with classes; however, a tool is run to generate classes and the tool creates cumbersome source files. The creation component 104 allows for generation of classes at runtime and thus source files are typically not generated and presented to a user. This provides a programmer with a benefit of programming against classes (e.g., as opposed to on raw database information) without managing source files.

A build component 106 operates as a central control unit of the creation component 104. The build component 106 can function as a processor for the creation component 104. Various aspects of the creation component 104 can engage at the start of runtime (e.g., operation of a computer program.) For instance, a user can attempt to access information from the database 102 (e.g., execute a query.) The build component 106 can sense the user attempt and instruct modules of the creation component 104 to begin operation.

A workspace component 108 functions to create a workspace 110 that can be populated with entity sets 112 and links 114. An entity set 112 can hold at least one entity. Thus, the workspace component 108 creates a shell that can hold at least one entity based on received entity data as well as at least one link 114 (e.g., association.) The created workspace 110 can be held in a storage device and be retained following completion of operation of the creation component 104. Entities are commonly metadata concerning the database 102. Example entities are table shape (e.g., columns and rows), relationships between tables, etc. An example entity joins two tables in a database into a single construct.

An entity component 116 produces entity information that relates to generation of classes. An entity is a conceptual shape that can be placed on a table. Moreover, the entity component 116 can produce mapping files (e.g., description of database schema (SSDL), description of entity model (CSDL), relationships between SSDL and CSDL (MISL), etc.) Mapping files can be generated by the entity component 116 and/or they can be customized and received from a programmer. The entity component 116 places produced entities into the workspace 110. According to one embodiment, the SSDL and CSDL produce entities 112 while the MISL produces links 114.

The entity component 116 can utilize artificial intelligence 118 in associating the estimated completion entry with the representation. The artificial intelligence 118 makes at least one inference or at least one determination or at least one of each in relation to generation of at least one class. Various scenarios can occur that are processed by the artificial intelligence 118. For example, the artificial intelligence 118 can identify characters in a file name that are illegal in a language being used by a programmer (e.g., the characters '>' is not usable in a particular language while a file is named '<customers>.) The artificial intelligence 118 can infer that a generated class should not have a specific character and send an alert message to a rules component 120 concerning the character.

Artificial intelligence 118 can employ one of numerous methodologies for learning from data and then drawing inferences and/or creating making determinations related to class generation (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

A rules component 120 can generate classes in accordance with at least one rule. The subject specification allows a user to perform operations upon a database while operating in a native programming language. In using the native programming language, there can be abstraction of capabilities such as connection to data, reading results, converting datatypes, etc. The rules component 120 allows for relatively seamless integration between the database and operations performed in a native programming language.

A query component 122 executes logic in production of at least one class. The logic can be derived from within a computer unit (e.g., storage) and/or received from an auxiliary location (e.g., from a user.) A programmer can inject custom code into the query component 122 and products of the code appear in at least one generated class. For example, a user can desire that in a table 'Customer.name' that an entry be no longer then 64 characters. When a class is generated, logic is run that implements desired logic (e.g., preventing generation of a name that is no longer then 64 characters.) In addition, the query component 122 can create at least one query that can navigate links between entities. This allows a programmer to access different relationships between tables.

A framework component 124 creates a context class from at least one produced class. A class context allows generates a single class (e.g., context class) from generated classes that serves as a staring point that a programmer can utilize when operating against the database 102. This generates a single class that contains properties desired by a programmer (e.g., that a 'customer.name' is no longer then 64 characters.)

Figure 2:
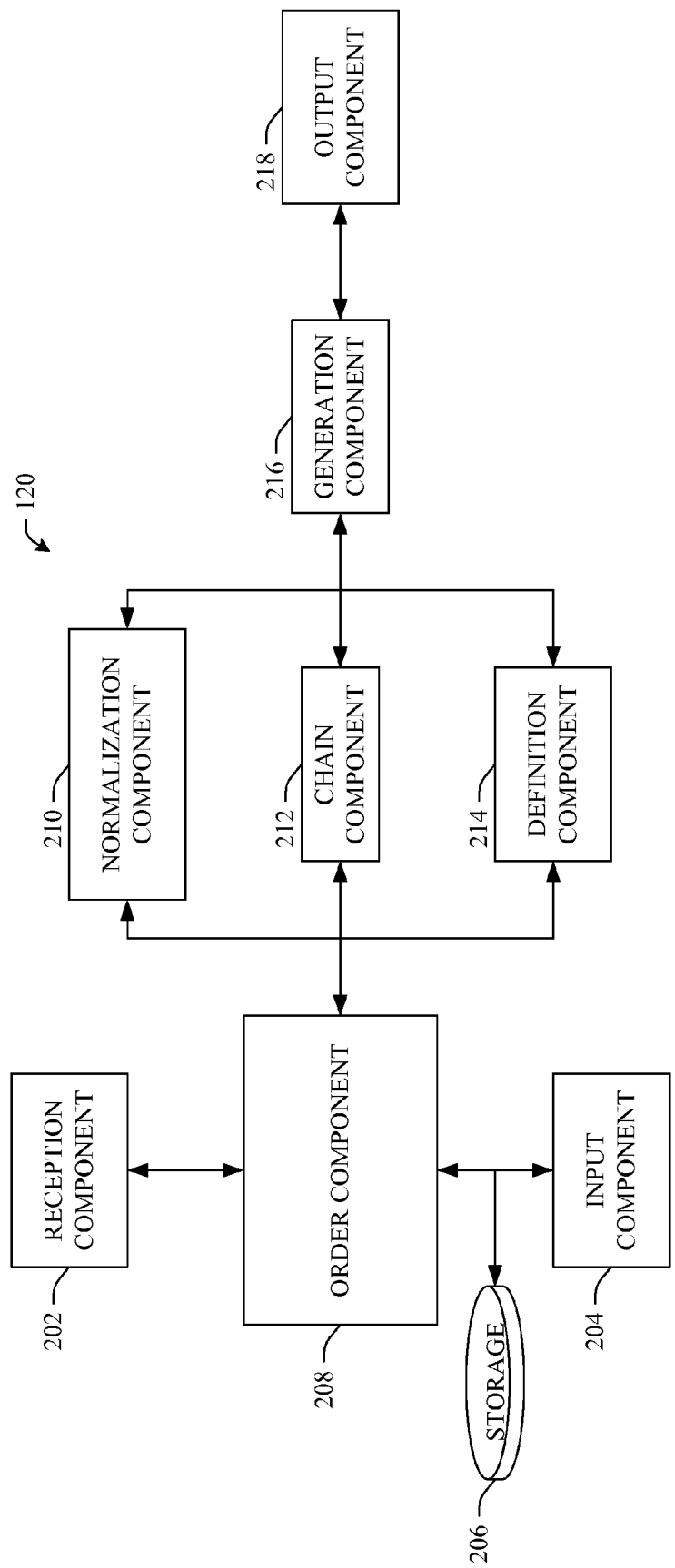
FIG. 2 illustrates a representative rules component in accordance with an aspect of the subject specification.

FIG. 2 discloses an example rules component 120. The rules component 120 functions with at least one rule in conjunction with class generation and can operate as a name service. When populating a workspace 110 of FIG. 1 with at least one entity (e.g., creating a conception model), names for entities, collections, methods, and relationships are created using different sets of rules. Rule sets are extensible, allowing for both 1:1 name matching and regular expression pattern matching. These rules convert stored artifact names to various pieces of a conceptual model. For example, relational database names first use the set of rules to define a class name for the entity. An entity name is then used to create a class collection name as well as property and field names for entity relationships. Similarly, database column names become property and field names in an entity.

A reception component 202 obtains entity data, commonly from the database 102. For example, entity data can be a table in which an entity is based. The reception component 202 can operate wirelessly, through a wired configuration, integration, etc. In addition, a programmer can use an input component 204 to modify operation of the rules component 120. For example, a user can desire to make a modification in an order rules are processed.

Typically, rules are held in storage 206 with various amounts of metadata (e.g., a default order that should be used unless otherwise provided.) The input component 204 can send a message to the storage 206 that a particular user provided rule that will override a default rule. This can be for a one-time generation or it can be a write-over of a default rule.

An order component 208 component places at least one rule in a sequence. Commonly, rules are considered in a specific order. This ensures consistency of naming results and allows rules to be chained more easily. It is to be appreciated that while rules are presented in a set order in the subject specification, other orders can be implemented. The order rules are considered in one embodiment is:

1. 1:1 mappings are considered
 2. Prefixes are considered
 3. Suffixes are considered
 4. Regular expression mappings are considered
 5. Base rules are considered A normalization component 210 homogenizes at least one name included in the database. Before considering mapping rules, names are normalized to remove characters that cannot be used through a native language. Some programming language cannot use certain characters in names. These characters can include: [ ] { } ! @ # $ % ^ & * ( ) ~ - _ = + \ | ; : ' , < > / ? and whitespace.

A chain component 212 links at least two rules together for use in production of at least one class. Collections of rules can be chained together to map more complicated names. For example, rule A is defined to remove the suffix "Tbl" and rule B is defined with a 1:1 map of the name "Cust" to "Customer". When rule B is chained to rule A, the name "CustTbl" will be mapped to "Customer"; this avoids complicated rules structures.

A definition component 214 composes at least one rule utilized in production of at least one class. There are several styles of rules that can be composed by the definition component. A first type is a 1:1 name mapping; when a name belongs to a 1:1 mapping and a mapped name is used. For example, a name "People" can have a 1:1 mapping to a name "Person". When "People" is present, the term automatically maps to "Person". Another style of rule is a prefix or suffix rule. These rules strip off prefixes or suffixes from a name. For example, a suffix rule of "Table" will map a name "CustomersTable" to "Customers". A further style of rule is a regular expression mapping. These mappings search for a regular expression pattern in a name and use a replacement string or replacement method to map a string. For example, a regular expression pattern might replace "ies" at the end of a string with a "y"; this rule would map "Categories" to "Category".

It is to be appreciated that other rule styles can be composed by the definition component 214.

A generation component 216 produces at least one class based on entity data and database information at runtime. The generation component can access at least one rule for production of at least one class in accordance with the sequence. A produced class can be used to construct a context class. Moreover, a class can rest on top of a conceptual model and allow a user to function with entities. The generation component 216 functions without producing a source file that is managed by a programmer.

According to one embodiment, the reception component 202 obtains the entity layer from an auxiliary location. For instance, the auxiliary location can be a terminal engaged by a user (e.g., the entity layer is a layer created by a user.) The reception component 202 can directly communicate with the generation component 216 to produce a class.

An output component 218 dispenses the generated class to a support position. For instance, a support position can be the query component 122 of FIG. 1. The query component 122 of FIG. 1 can modify a generated class with association information that related to entities.

Figure 3:
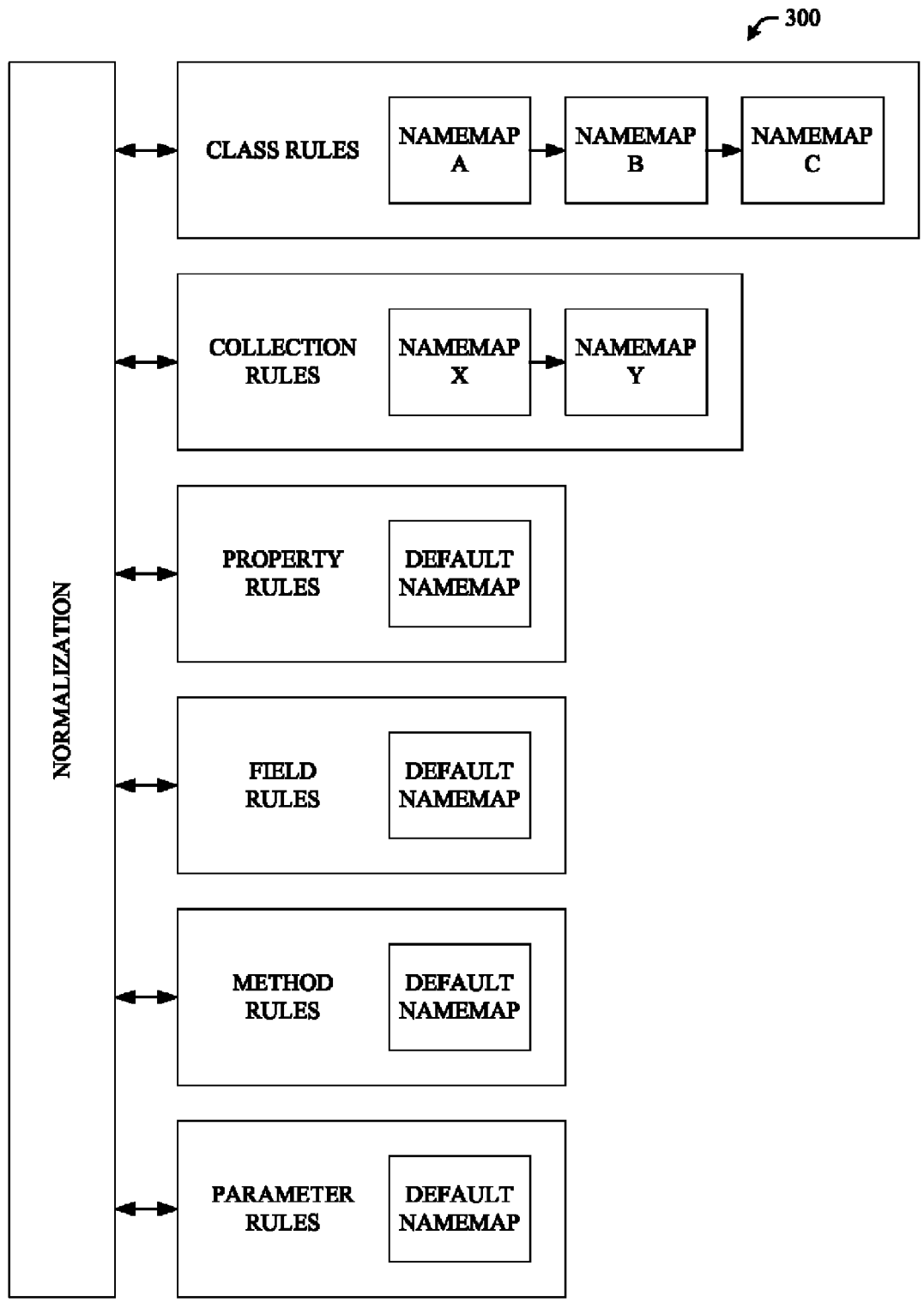
FIG. 3 illustrates a representative operation of a rules component in accordance with an aspect of the subject specification.

FIG. 3 discloses an example configuration 300 of the rules component 120. A collection of rules is included in a NameMap. NameMaps can store a number of rule styles, as well as a reference to a chained NameMap. NameMaps exist for the specific types of names that are needed to generate dynamic types: class names, class collection names, field names, property names, method names, and method parameter names. These NameMaps are stored in a single rules component 120 of FIG. 1 instance. In FIG. 3, there are three sets of rules chained together for Class names. When the rules component 120 of FIG. 1 resolves a class name, it first runs the rules in NameMap A, then NameMap B, then NameMap C. The following discloses an example operation of the rules component 120 of FIG. 1 in conjunction with FIG. 2 and FIG. 3.

Class Collection
   1. Normalization rules
   2. 1:1 mappings are searched:

| Object Name | Collection Name |
|---|---|
| Person | People |
| Goose | Geese |
| Man | Men |
| Woman | Women |
| Child | Children |
| Tooth | Teeth |
| Die | Dice |
| Data | Datum |
| Use | Uses |

3. Regular expression mappings (case independent):
      a. Words ending in sh→shes
      b. Words ending in ss→sses
      c. Words ending in dge→dges
      d. Words ending in ase→ases
      e. Words ending in ch→ches
      f. Words ending in [consonant]o→[consonant]oes
      g. Words ending in [consonant]y→[consonant]ies
      h. Words ending in [vowel]lf→[vowel]lves
      i. Add s Class
   1. Normalization rules
   2. 1:1 mappings are searched:

| Conceptual Name | Object Name |
|---|---|
| People | Person |
| Geese | Goose |
| Men | Man |
| Women | Woman |
| Children | Child |
| Teeth | Tooth |
| Dice | Die |
| Datum | Data |
| Uses | Use |

3. Prefixes are searched:

| |
|---|
| Table |
| Tbl |
| Column |
| Col |

4. Suffixes are searched:

| |
|---|
| table |
| tbl |
| column |
| col |

5. Regular expression mappings (case independent):
      j. Words ending in shes→sh
      k. Words ending in sses→ss
      l. Words ending in dges→dge
      m. Words ending in ases→ase
      n. Words ending in ches→ch
      o. Words ending in [consonant]oes→[consonant]o
      p. Words ending in [consonant]ies→[consonant]y
      q. Words ending in [vowel]lves→[vowel]lf
      r. Words ending in s→remove s Field
   1. Normalization rules
   2. The first character of the name becomes lower case
   3. An '_' character is appended to the begging of the name Property
   1. Normalization rules
   2. The first character of the name becomes upper case Method
   1. Normalization rules
   2. The first character of the name becomes upper case MethodParameter
   1. Normalization rules
   2. Names that begin with '@' have the next character converted to upper case The following is an example operation in conjunction with the subject specification. Many companies will prefix table names with "tbl". For simplicity, usability, and code readability perspective the user does not want their backend naming convention to flow through into their object names. Given the example where there is a table called "tblcustomers" the default code generation could force the developer to use the following coding pattern:

For Each tblCustomer In dynamicContext.tblCusotmers
      Console.WriteLine(tblCustomer.FirstName)

Next

Though completely useable, this is not the exact format that a user would commonly like to think of collections and types. A more appropriate format can be:

For Each customer In dynamicContext.Customers Console.WriteLine(customer.FirstName)
Next The names make more sense, are more usable, more memorable, and can help improve productivity of the developer if they can code in terms of how they expect the objects to be named.

The developer could override the entire naming service by providing map files. However, this typically requires that the developer knows a database schema, their conceptual model, and the mapping between the two. Therefore, map files can be generated through use of the system 100.

In order to support this experience there can be an extension of default naming service to allow developers to control how mappings are accomplished from their conceptual description to object representation. Below is a sample that describes the table name, column names, and the code needed to map the table name to one class name and the Field Names to the field and property names of the class.

TABLE

AWTPRODUCTS

Columns
    ProdId
    ProdName
    ProdPrice
    ProdCode
NameMap custTableMap = new NameMap( );
custTableMap.AddNameMapping("AWTPRODUCTS", "Product");
NameMap custColumnMap = new NameMap( );
custColumnMap.AddPrefixMapping("Prod", String.Empty);
NameService custNameService = new NameService( );
custNameService.ClassNameMap = custTableMap;
custNameService.PropertyNameMap = custColumnMap;
custNameService.FieldNameMap = custColumnMap;

This provides a layer so that a developer does not have to do the more complex modeling that Architect types commonly perform. First, a new mapping is defined that will contain the direct mapping for the table name: AWTPRODUCTS→Product. Next, a second mapping is defined for a prefix to replace all instances of the string "Prod" that occurs at the beginning of the name with an empty string. When custom mappings are set, users can specify to run the default rules when processing a name. For example, in the case of converting the column "ProdId" to a field, the column name will first be mapped using the custom rule to "Id". Next, the default rule is run to convert the name "Id" to "_id".

Now the developer can provide mappings for only those specific things they want to "rename" either at a specific "class", "field", "property" level, globally for a specific pattern (e.g., the tbl prefix described above), or for a specific string. As entities are built up, there is use of naming service already in entity framework. As entities are created (e.g., classes), there is evoking of the naming service. There is a check if there are any rules that are available by default to change the name of the entity (e.g., category to categories). Developers can provide a regex expression and register for an event that provides the developer access to the named and the developer can rename. There can be register for things so they can be notified that there is generating a class and they can provide expressions or delegates to change names of classes as they are created. Items generated for a class (queries, fields, methods, etc.), default mapping can be overrun in code.

Figure 4:
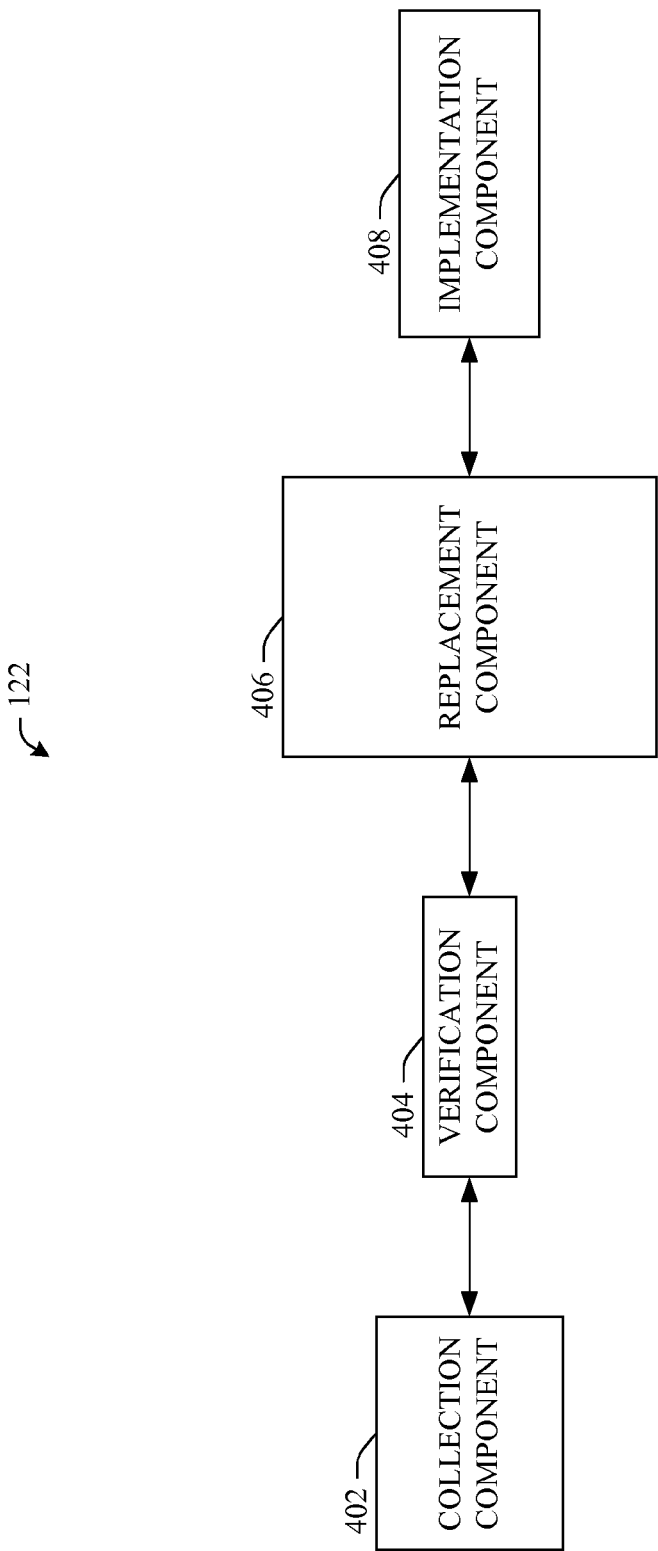
FIG. 4 illustrates a representative query component in accordance with an aspect of the subject specification.

FIG. 4 discloses an example query component 122 in accordance with an aspect of the subject specification. A collection component 402 obtains a class based off entity information. Commonly, the class is produced from the output component 218 of FIG. 2 of the rules component 120 of FIG. 1. In addition, the collection component 402 obtains logic that can operate upon the class. The logic can be obtained from storage 206, from a user through the input component 204 of FIG. 2, etc. The collection component 402 can operate as a means for collecting logic that regulates generation of a class.

A verification component 404 determines that logic received from a developer is capable of being run. The verification component 404 can operate as a check of validity. For example, a programmer can transfer logic to a query component 122 that is inconsistent (e.g., a request that a name be no longer then 40 characters, but no shorter then 45 characters.) Execution of an inconsistent request can cause errors upon the system 100 of FIG. 1. Therefore, the verification component 404 can halt operation of the custom logic if an error is anticipated. A notice can be sent to the developer alerting her of the error or the verification component 404 can send a signal that the stored logic should be implemented.

A query component 122 typically operates logic saved in internal storage. However, a developer can enter his or her own logic at design time to generate code at runtime. A replacement component 406 can operate as a means for replacing stored logic with logic submitted by a user. As a default, logic saved in storage 208 of FIG. 2 can be run by the query component 122. However, if a programmer desires to have custom logic run, then the replacement component 406 can suppress the saved logic so the custom logic can be implemented.

An implementation component 408 can run logic designated by the replacement component 406. The implementation component 408 can operate as a means for implementing collected logic. According to one embodiment, the implementation component 408 can apply logic against a class generated through the entity component. The output of the implementation component is commonly a modified class.

Figure 5A:
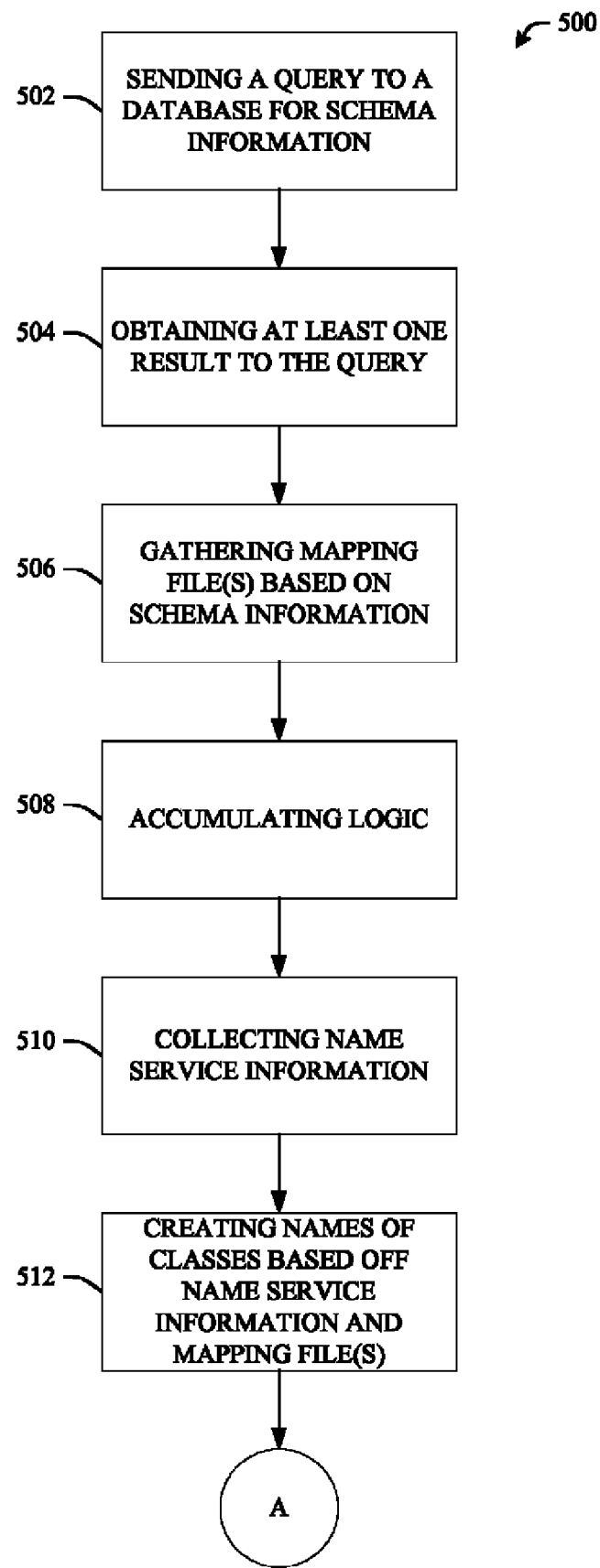
FIG. 5a illustrates a first part of a representative context class construction methodology in accordance with an aspect of the subject specification.
Figure 5B:
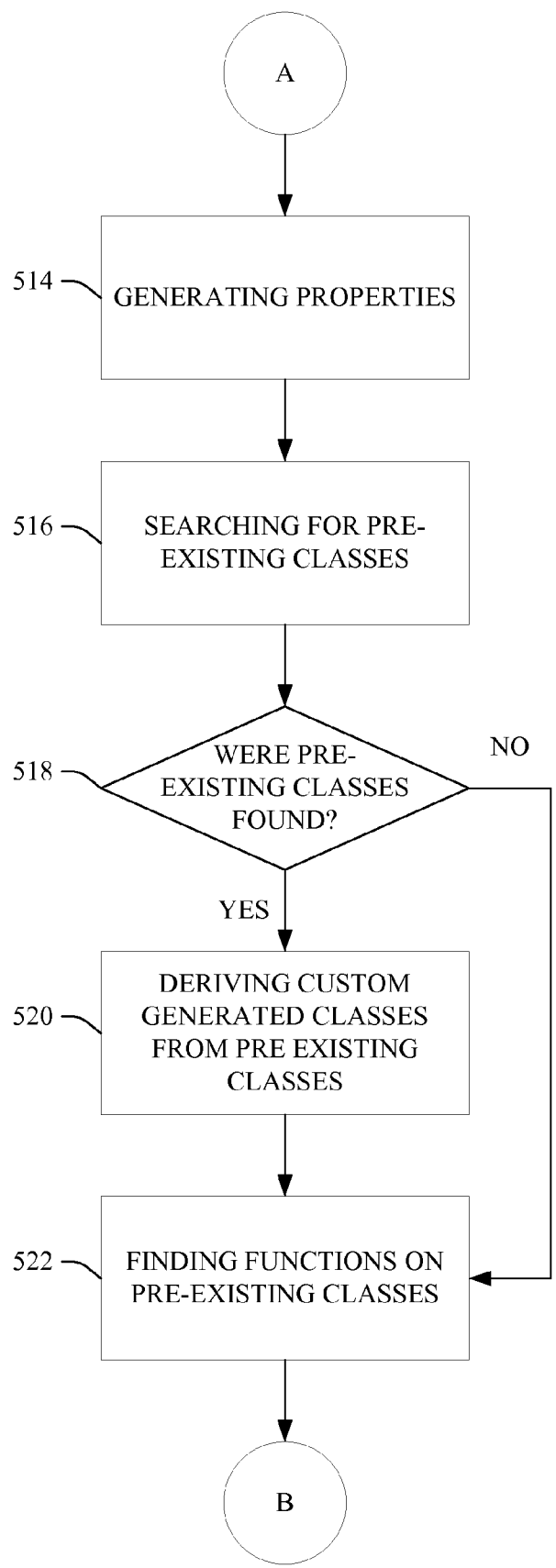
FIG. 5b illustrates a second part of a representative context class construction methodology in accordance with an aspect of the subject specification.
Figure 5C:
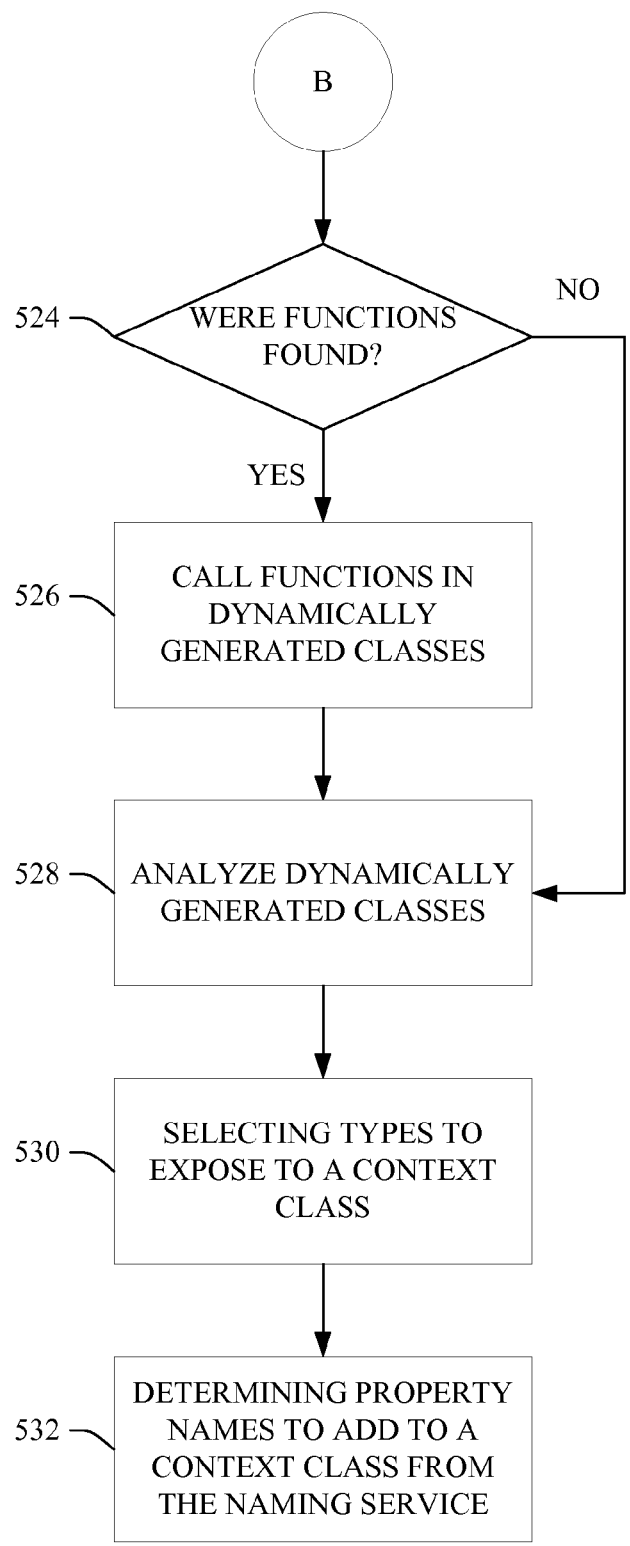
FIG. 5c illustrates a third part of a representative context class construction methodology in accordance with an aspect of the subject specification.

FIG. 5a to FIG. 5c discloses an example context class construction methodology 500. A query is sent (e.g., applied) to a database to obtain schema information 502. Commonly, action 502 commences with a program start (e.g., at runtime.) Sending the query to the database produces a result that related to a database schema. There is obtaining at least one result to the query 504. For example, action 502 can send a query requesting the database return a table named 'customers'.

There is gathering mapping file(s) (e.g., one or more mapping file) based on schema information 506. A mapping file can be generated and gathered once generation is complete. However, a programmer can create a custom mapping file and the methodology 500 can implement both the custom mapping file(s) and the generated mapping file(s). There can be accumulating logic 508 that can operate in conjunction to generating classes. Logic ultimately allows for association between entities to be analyzed. Moreover, there is collecting name service information 510. Name service information allows various rules to be implemented in association with class generation.

Action 512 is creating names of classes based off name service information and mapping file(s). In addition to generating names of classes, there can be generating properties 514, such as relationship properties (e.g., Customer.Orders.)

A search 516 is preformed to locate pre-existing classes whose names match generated class names. A check 518 is performed if pre-existing classes were found and/or if a single pre-existing class was found. If a matching pre-existing class name is found, then there is deriving custom generated classes from those pre-existing classes 520. If matching classes are not found, then classes are not modified and the methodology 500 continues.

Event 522 is finding functions on pre-existing classes. This can be performed with similar functionality as performed by act 516. A check can occur if functions on pre-existing classes whose names match property names generated by the naming service are available. If functions are available, then call the functions in dynamically generated classes 526. Analysis of dynamically generated classes 528 occurs to determine what types to expose to a context class (e.g., Customer, Order, etc.) and then there is selecting type to expose to the context class 530 that can be based off the analysis of action 528. Determining property names to add to a context class from the naming service 532 takes place (e.g., Customer, Order, etc.) This allows for generation of context class based on dynamically generated classes and naming service.

Figure 6:
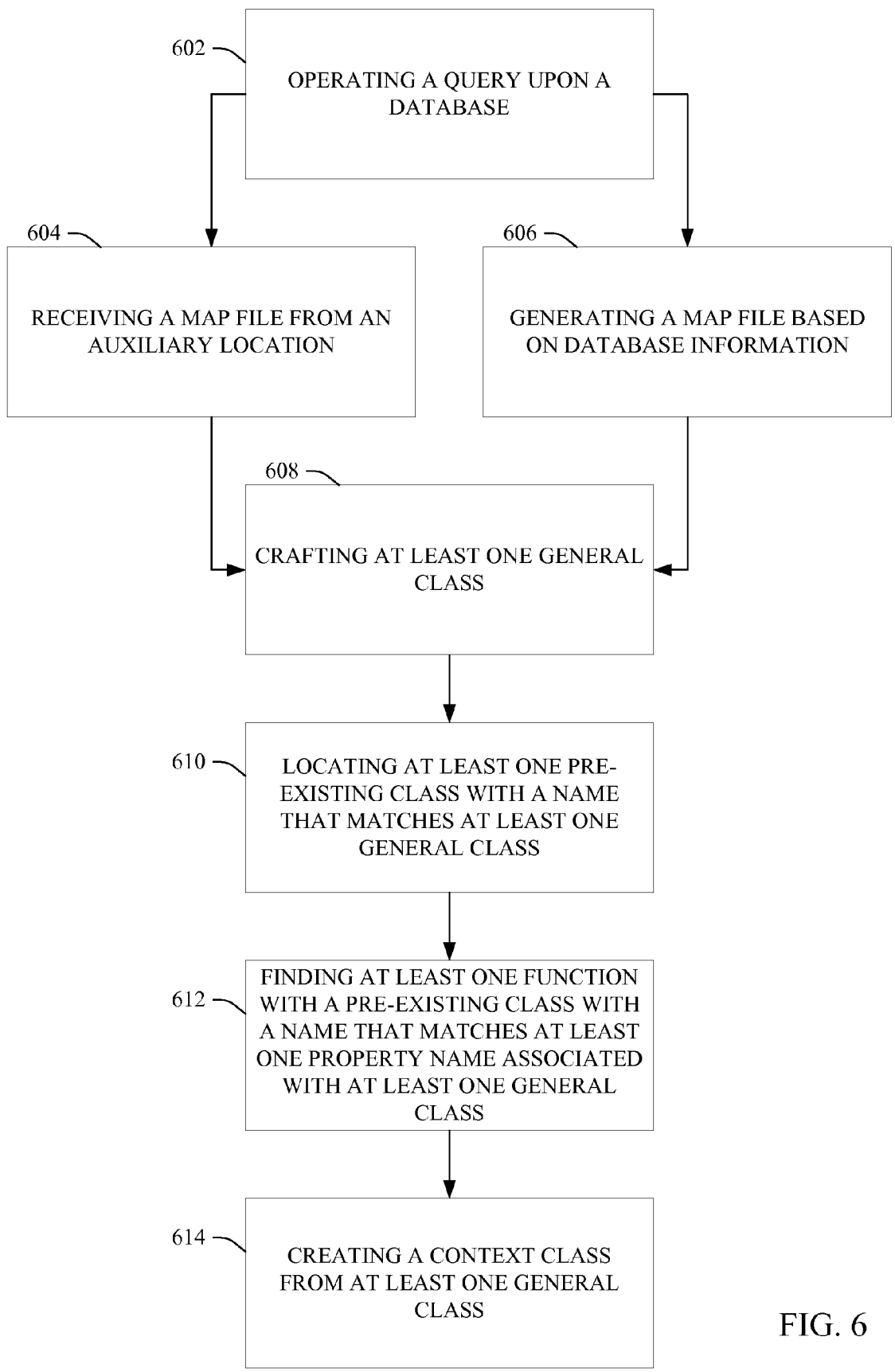
FIG. 6 illustrates a representative context class building methodology in accordance with an aspect of the subject specification.

FIG. 6 discloses an example methodology 600 for construction of a context class. Providing a context class to a user allows the user to program off a database and access database information while retaining functionality of a native programming language (e.g., a language the user is engaging.) The context class can be used by the programmer as a unit in which to begin engagement with a database. Actions of the methodology 600 can operate automatically at runtime of an application.

Operating a query upon a database 602 takes place. Commonly, the query is run to obtain database schema information. Example schema information is tables, columns, constraints, etc. Operation of a query commonly involves sending a request to a database to gather schema information and/or receiving schema information. When schema information is received, it can be in an organized or raw form.

Event 604 is receiving a map file from an auxiliary location. Map files can be used to in construction of a general class. Example map files are files that describe a database schema, describe an entity model, mapping between other map files, etc. Example auxiliary locations are from a programmer, from an internal storage location, from a communication unit (e.g., though transmission from a remote device), etc. There can be generating a map file based on database information 606. The methodology 600 can look at results of the query and create at least one map file based on the query results. This allows the map file to be custom tailored to what was discovered through the query. Files do not necessarily come from the same location (e.g., a schema description file can come from a programmer while an entity model description can be generated.)

Constructing at least one general class 608 occurs. Construction of a general class can be based off at least one map file that relates to a database, at least one name service, logic, or a combination thereof. Construction of a general class commonly includes generating names of classes as well as names of properties (e.g., Customer.Orders.) Construction off a map file alone can include a scenario when there are no rules that are to be implemented and no intended restraints. A general class can be based off a name service by itself when there is minimal entity data/schema information and no intended restraints. Logic alone can be used in general class construction when there is minimal entity/schema data and no rules for implementation.

Action 610 is attempting to locate at least one pre-existing class with a name that complements (e.g., matches) at least one general class. If a matching class is found, then a custom generated class can be derived from the pre-existing class. This allows the generated class to be presented in a more accessible format since it encompasses information that exists and is likely operational. If a complementing pre-existing class is not found, then the methodology 600 continues and the general class continues in a raw form.

There is finding at least one function with a pre-existing class of a name that matches at least one property name associated with at least one general class 612. If a matching name is found, then properties can be modified to allow a general class to include appropriate property information. If there is no found matching name, then the methodology 600 can continue.

Act 614 is creating a context class from at least one general class. Included in creating a context class can be analyzing the generated class (e.g., originally generated class, generated class changed due to matching function, generated class modified due to complementing pre-existing class, etc.) to understand what should be exposed in the content class (e.g., Customer, Orders, etc.) Based on an understanding, a context class is generated and property names are added to the context class based on the naming service.

Figure 7:
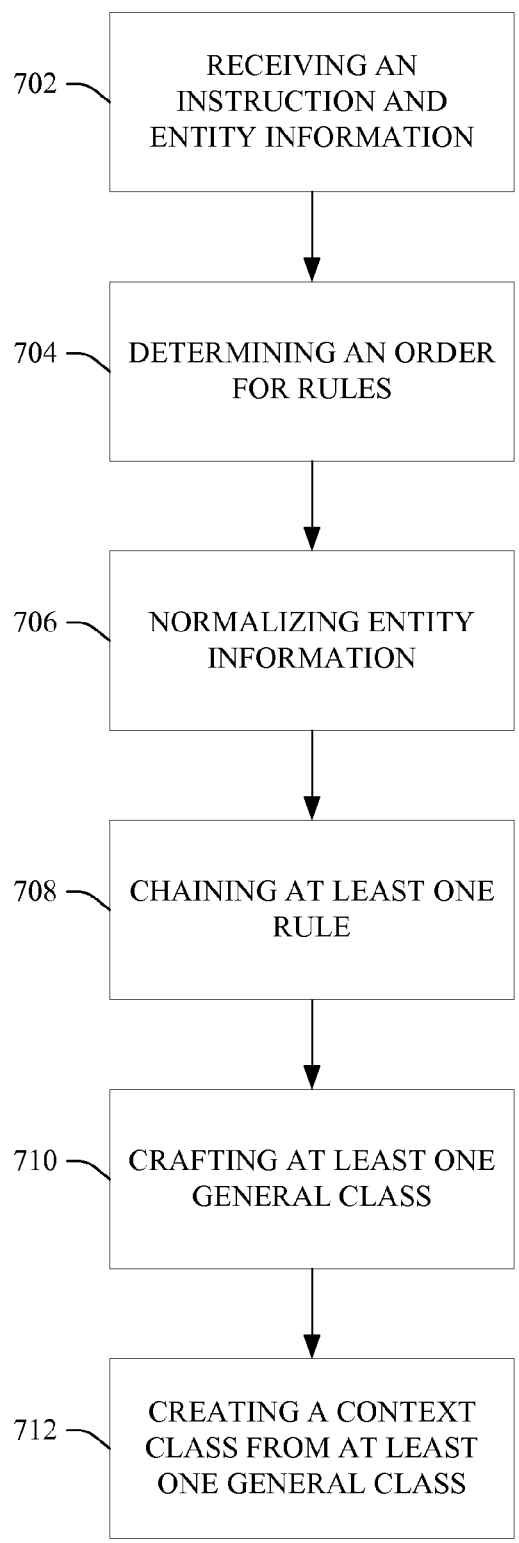
FIG. 7 illustrates a representative rule implementation methodology in accordance with an aspect of the subject specification.

FIG. 7 discloses a methodology 700 for implementing rules (e.g., functioning a rules component, operating a name service, etc.) Rules allow for creation of relationships between entities. Relationships can be important in construction of both a general class as well as construction of a context class that is used by a developer.

There is receiving an instruction and entity information 702. Commonly, the methodology 700 does not randomly begin, but it begins when an instruction is received. Commonly, this is at runtime after a workspace is populated with entity information. Entity information is also received that can include entities that are populated in the workspace.

Act 704 is selecting rules for use in the methodology 700. Depending on what entities are in a workspace and what operations are to be performed, rules are selected for further operation. In addition, if a rule is not available, act 704 can include defining rules (e.g., 1:1 name mapping, prefix elimination, suffix elimination, etc.)

Determining an order for rules 706 occurs. Allowing rules to operate in a set order allow for consistency in naming when multiple rule operations take place (e.g., there are multiple entities that are processed by the methodology 700.) Various embodiments can be used in determining rule order, including artificial intelligence, learned algorithms (e.g., an order based on success and failure of previous engagements of the methodology 700), user instruction, random, hard coded (e.g., a consistent order when the methodology 700 is run), etc.

Action 708 is normalizing entity information. Entity information is commonly in a language consistent with the database (e.g., Structured Query Language.) However, a database language commonly allows for characters that are not available to a user operating a different language. Therefore, names (e.g., entity names) are normalized to eliminate characters unavailable in a developer's language. There can be analysis of a programmer's language, identifying illegal characters, and performing the normalization.

Constructing at least one general class 710 occurs. Construction of a general class can be based off at least one map file that relates to a database, at least one name service, logic, or a combination thereof. Construction of a general class commonly includes generating names of classes as well as names of properties (e.g., Customer.Orders.) Construction off a map file alone can include a scenario when there are no rules that are to be implemented and no intended restraints. A general class can be based off a name service by itself when there is minimal entity data/schema information and no intended restraints. Logic alone can be used in general class construction when there is minimal entity/schema data and no rules for implementation.

Act 712 is creating a context class from at least one general class. Included in creating a context class can be analyzing the generated class (e.g., originally generated class, generated class changed due to matching function, generated class modified due to complementing pre-existing class, etc.) to understand what should be exposed in the content class (e.g., Customer, Orders, etc.) Based on an understanding, a context class is generated and property names are added to the context class based on the naming service.

Figure 8:
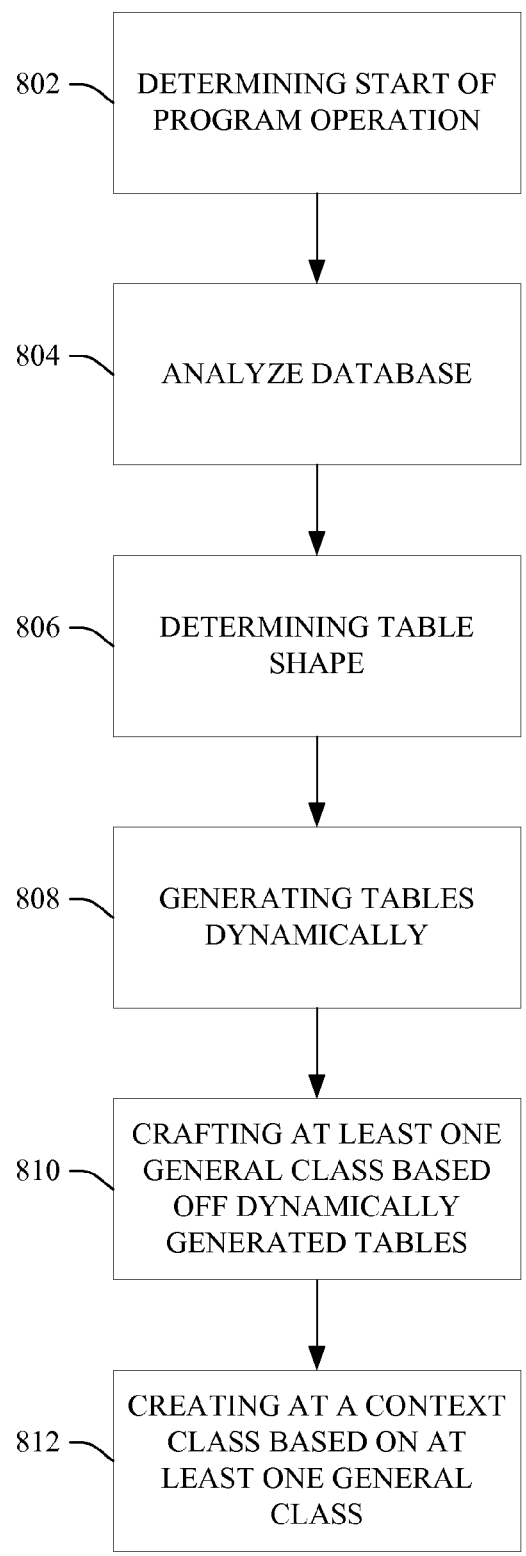
FIG. 8 illustrates a representative table generation methodology in accordance with an aspect of the subject specification.

FIG. 8 discloses an example an example methodology 800 for table generation. The methodology 800 provides a context in which other disclosed information can fit in general database operations. Operation of the methodology 800 allows a programmer to operate with classes without management of undesirable source files.

Event 802 is determining a start of a program operation. The methodology 800 operates at runtime, so it can be important that a determination is made when the program starts (e.g., the beginning of runtime.) This allows for an initiation of when other disclosed operations should commence.

There can be analysis of a database 804 that can include a number of different procedures. Analysis of the database can include finding different information, different tables, metadata concerning the tables, etc. This can include both generic analysis of the database (e.g., how many tables does the database include), as well as specific database analysis (e.g., find the table 'Customers', appreciate relationships of the table 'Customers', and locate tables that have relationships with 'Customers, etc.)

Determining table shape 806 allows for generating tables dynamically 808. Dynamically generated tables are based on the shape of database tables. A program can operate off dynamically generated tables and thus operations can be conducted without source files that a programmer manages. This allows a developer to operate in conjunction of a database with fewer tedious tasks that allow for more efficient programming.

Constructing at least one general class 810 occurs, which can be based on dynamically generated tables. Construction of a general class can be based off at least one map file that relates to a database, at least one name service, logic, or a combination thereof. Construction of a general class commonly includes generating names of classes as well as names of properties (e.g., Customer.Orders.) Construction off a map file alone can include a scenario when there are no rules that are to be implemented and no intended restraints. A general class can be based off a name service by itself when there is minimal entity data/schema information and no intended restraints. Logic alone can be used in general class construction when there is minimal entity/schema data and no rules for implementation.

Act 812 is creating a context class from at least one general class. Included in creating a context class can be analyzing the generated class (e.g., originally generated class, generated class changed due to matching function, generated class modified due to complementing pre-existing class, etc.) to understand what should be exposed in the content class (e.g., Customer, Orders, etc.) Based on an understanding, a context class is generated and property names are added to the context class based on the naming service In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Figure 9:
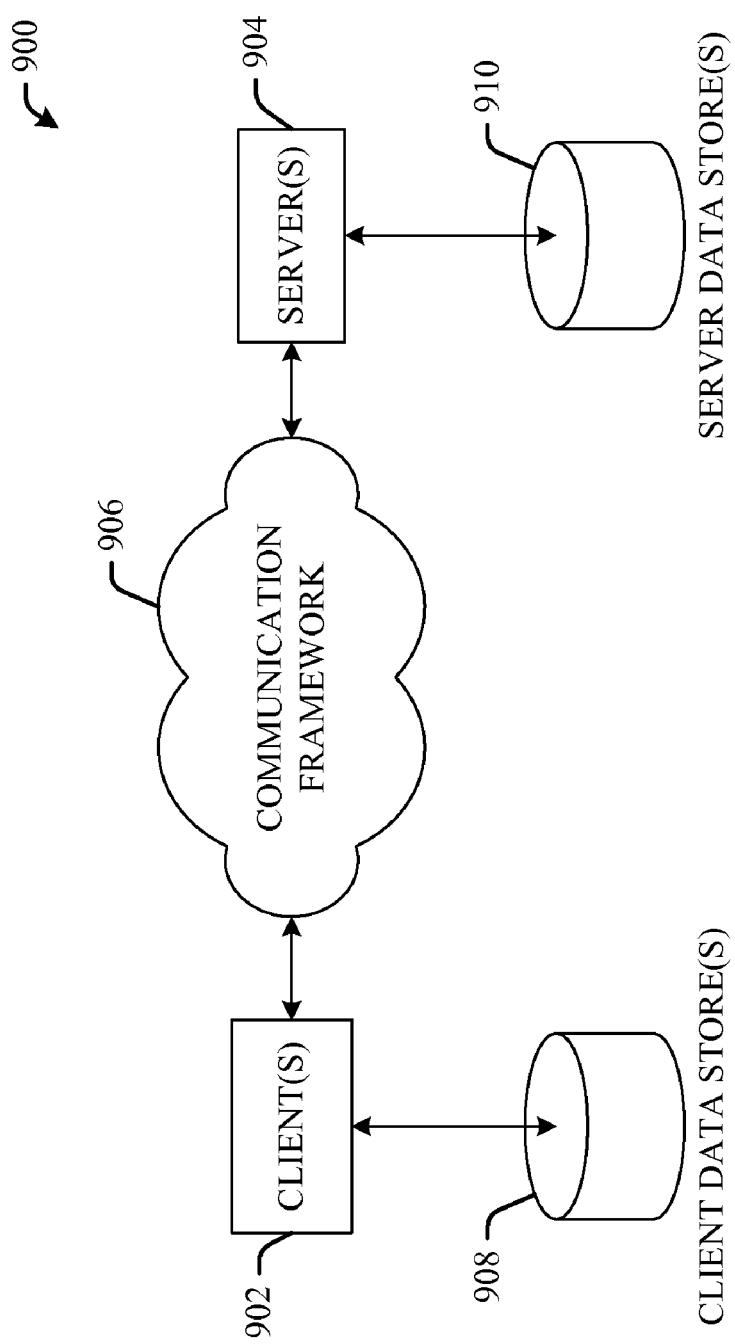
FIG. 9 illustrates an example of a schematic block diagram of a computing environment in accordance with the subject specification.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Figure 10:
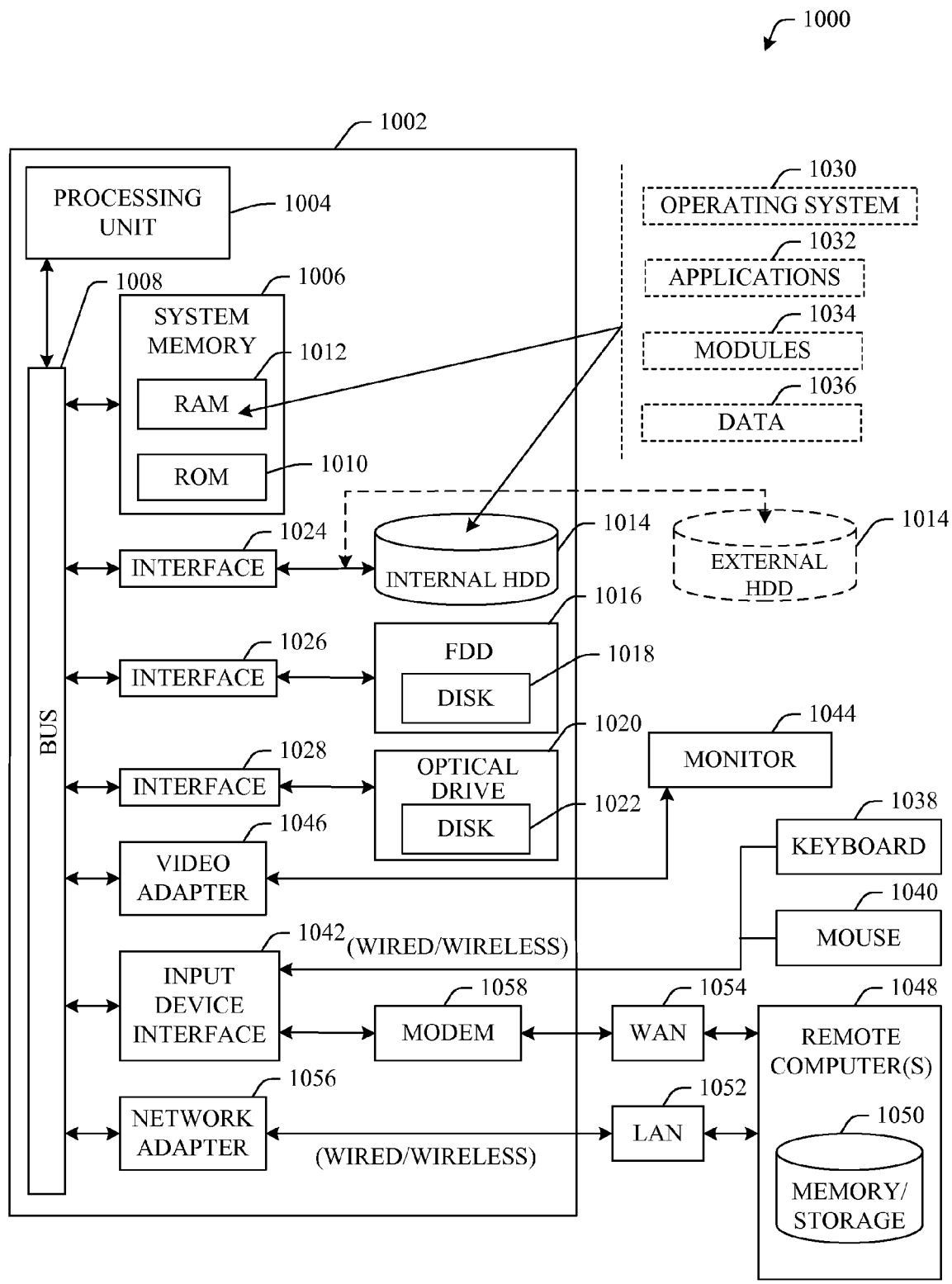
FIG. 10 illustrates an example of a block diagram of a computer operable to execute the disclosed architecture.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a memory having computer executable components stored thereon; and
 a processor communicatively coupled to the memory, the processor configured to execute the computer executable components, the computer executable components comprising:
  a reception component configured to obtain entity data derived from information stored in a database, wherein the reception component is further configured to obtain the entity data from an auxiliary location; and
  a generation component configured to produce at least one general class based on the entity data at runtime, the generation component further configured to produce a context class at runtime based on the at least one general class and at least one property requested by an external entity via a native programming language, wherein the context class provides the at least one property requested by the external entity, and wherein the context class facilitates-operating against the database in the native programming language.

2. The system of claim 1, further comprising a definition component configured to compose at least one rule utilized in production of the at least one general class.

3. The system of claim 1, further comprising a chain component configured to link at least two rules together for use in production of the at least one general class.

4. The system of claim 1, further comprising an order component configured to place at least one rule in a sequence, wherein the generation component is further configured to access at least one rule for production of the at least one general class in accordance with the sequence.

5. The system of claim 1, further comprising an artificial intelligence component configured to make at least one of an inference or a determination in relation to an operation of the generation component.

6. The system of claim 1, further comprising a workspace component configured to create a shell that can hold at least one entity based on received entity data.

7. The system of claim 1, further comprising a build component configured to regulate control of the generation component.

8. The system of claim 1, further comprising a query component configured to execute logic in production of the at least of at least one general class.

9. The system of claim 1, wherein the generation component is configured to facilitate an automatic processing of source code.

10. A method, comprising:
 employing a processor to execute computer executable instructions stored on a computer readable storage medium to implement the following acts:
  constructing at least one general class from at least one map file that relates to a database, at least one name service, logic, or a combination thereof;
  creating a context class at runtime based on the at least one general class and at least one property requested by an external entity via a native programming language, wherein the context class facilitates an interaction between the database and the external entity in the native programming language by providing the at least one property requested by the external entity; and homogenizing at least one name included in the database.

11. The method of claim 10, further comprising receiving the at least one map file for constructing the at least one general class from an auxiliary location.

12. The method of claim 10, further comprising generating a map file for constructing the at least one general class based on database information.

13. The method of claim 12, further comprising operating a query upon the database, wherein a result of the query is used in generation of a map file.

14. The method of claim 10, further comprising attempting to locate at least one pre-existing class with a name that complements the at least one general class.

15. The method of claim 10, further comprising finding at least one function of a pre-existing class with a name that matches at least one property name associated with the at least one general class.

16. A computer-readable storage medium, comprising:
computer-readable instructions, the computer-readable instructions including instructions for causing at least one processor to perform the following acts:
receiving commands from an external entity for manipulation of at least one rule employed in production of at least one general class;
collecting logic that regulates generation of a context class at runtime based on the at least one general class generated at runtime and at least one property requested by the external entity via a native programming language; and
implementing the logic into the context class, wherein the context class provides a runtime programming interface between a database operating with a database programming language and the external entity operating with the native programming language, and wherein the programming interface provides the at least one property requested by the external entity and facilitates applying at least one program in the native programming language to the database based on the logic.

17. The system of claim 16, further comprising replacing the logic with a different logic created by the external entity.

* * * * *